(12) United States Patent
Kern

(10) Patent No.: US 9,494,210 B2
(45) Date of Patent: Nov. 15, 2016

(54) VEHICLE MOUNT AND METHOD

(75) Inventor: John Louis Kern, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 1993 days.

(21) Appl. No.: 11/462,439

(22) Filed: Aug. 4, 2006

(65) Prior Publication Data

US 2008/0029942 A1 Feb. 7, 2008

(51) Int. Cl.
*F16F 13/00* (2006.01)
*F16F 13/10* (2006.01)
*F16F 13/14* (2006.01)

(52) U.S. Cl.
CPC ......... *F16F 13/101* (2013.01); *F16F 13/1409* (2013.01)

(58) Field of Classification Search
CPC ..... F16F 13/08; F16F 13/101; F16F 13/1409
USPC ................ 267/140.11, 140.13, 140.2, 140.3, 267/140.4, 140.5, 141, 141.2, 141.3
See application file for complete search history.

(56) References Cited

U.S. PATENT DOCUMENTS

| | | | |
|---|---|---|---|
| 4,560,150 A * | 12/1985 | Shtarkman | 267/35 |
| 4,577,842 A * | 3/1986 | Shtarkman | 267/140.13 |
| 4,858,879 A * | 8/1989 | Miyamoto et al. | 267/140.13 |
| 4,901,986 A | 2/1990 | Smith | |
| 4,974,819 A | 12/1990 | Reichard et al. | |
| 4,997,168 A * | 3/1991 | Kato | 267/140.13 |
| 5,102,105 A | 4/1992 | Hamaekers et al. | |
| 5,121,904 A * | 6/1992 | Freudenberg | 267/140.13 |
| 5,172,893 A * | 12/1992 | Bouhier et al. | 267/140.12 |
| 6,068,246 A | 5/2000 | Lee et al. | |
| 6,311,963 B1 | 11/2001 | Suzuki et al. | |
| 6,443,438 B2 | 9/2002 | Satori et al. | |
| 6,499,729 B1 | 12/2002 | Walterbusch | |
| 6,511,060 B2 | 1/2003 | Yamamoto et al. | |
| 6,557,839 B2 | 5/2003 | Tanaka | |
| 6,588,737 B2 | 7/2003 | Goto et al. | |
| 6,598,865 B1 | 7/2003 | Kato | |
| 6,663,090 B2 | 12/2003 | Simuttis et al. | |
| 2001/0004141 A1 | 6/2001 | Shimoda et al. | |
| 2004/0004317 A1 | 1/2004 | Hatano et al. | |
| 2007/0131501 A1* | 6/2007 | Fader et al. | 188/321.11 |

FOREIGN PATENT DOCUMENTS

| | | | | |
|---|---|---|---|---|
| JP | 60157538 A | * | 8/1985 | F16F 13/00 |
| JP | 62209241 A | * | 9/1987 | F16F 13/00 |

* cited by examiner

*Primary Examiner* — Xuan Lan Nguyen
(74) *Attorney, Agent, or Firm* — Kenealy Vaidya LLP

(57) ABSTRACT

An vehicle/engine mount can include a first connection device for connecting to an engine power system, a second connection device that is configured to connect to either the vehicle frame or the vehicle body, a stopper system, and a damper system. The damper system can be configured to prevent transmission of vibration or movement between the first connection device and the second connection device. The stopper system can include a liquid-filled bladder device located adjacent one of the first connection device and second connection device and configured such that it provides an ultimate limit for one of axial and radial movement/vibration of the first connection device relative to the second connection device.

18 Claims, 10 Drawing Sheets

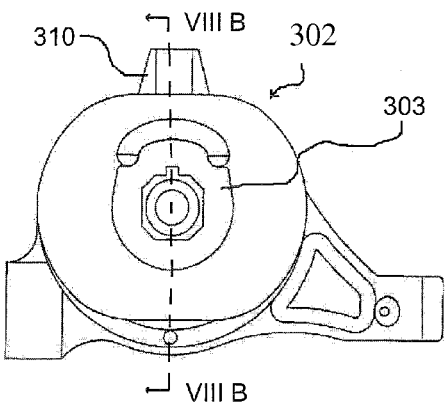
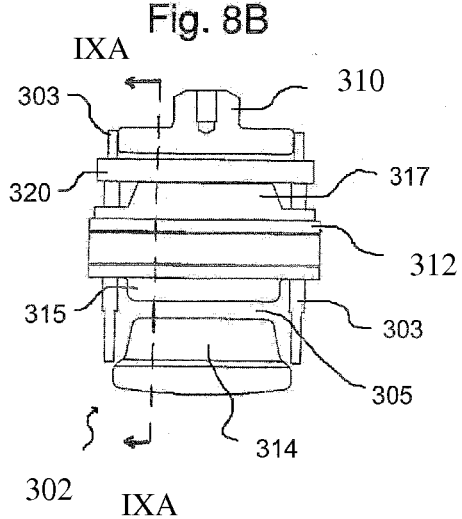

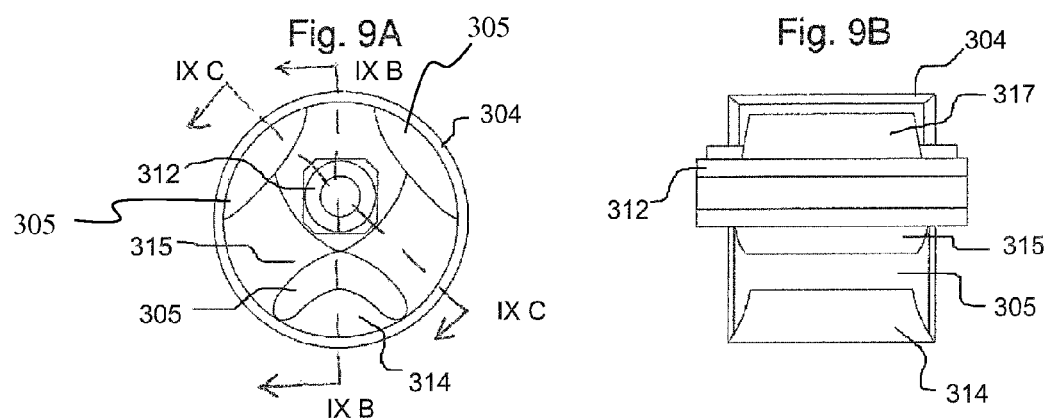
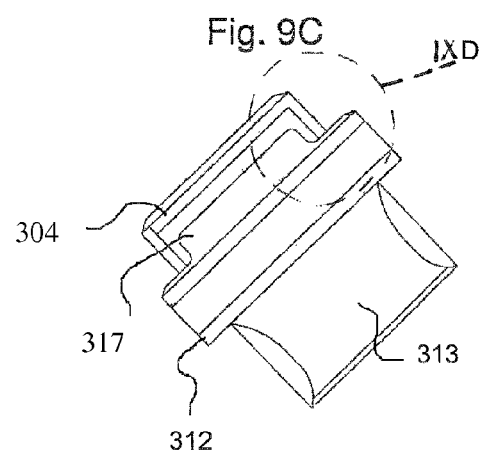
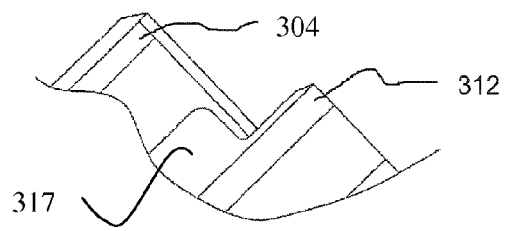

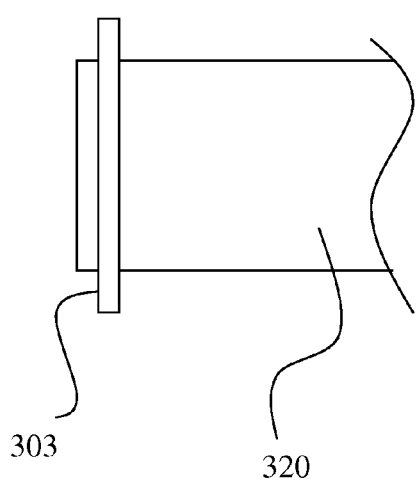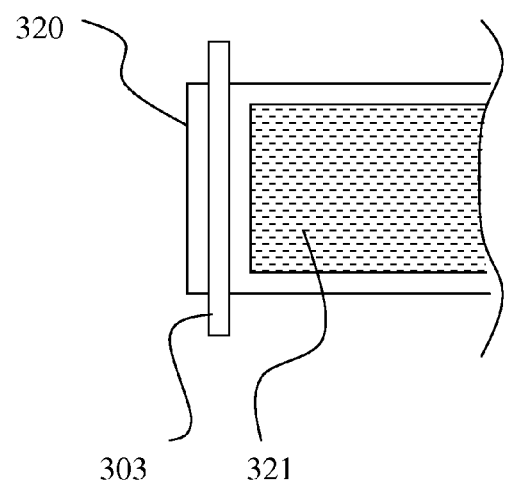

VEHICLE MOUNT AND METHOD

BACKGROUND

1. Field

The disclosed subject matter relates to a vehicle mount and method. More particularly, the disclosed subject matter relates to an engine mount that includes a stopper having a bladder mechanism or fluid cushion system, and method of operation thereof.

2. Brief Description of the Related Art

Engine mounts are typically used to connect a vehicle's frame to the vehicle's power plant. A damper mechanism or brake mechanism can be incorporated into the engine mount to reduce the amount of vibration, motion, and energy transmitted between the vehicle's power plant and the vehicle's body frame. Thus, a driver or operator experiences less noise vibration and harshness when operating the vehicle.

Conventional engine mounts are commonly used as engine, gearing or transmission suspensions in motor vehicles. The action of these mount systems is substantially axial, and in the direction of a longitudinal axis of the engine mount. One end of the mount system can be directly attached to the motor housing/gearing housing/transmission housing/etc., and an opposite end of the mount system can be directly attached to the vehicle body or frame/sub-frame. Many variables, including the weight of the power plant, the amplitude and frequency of vibration produced by the power plant, the type of vehicle, and other variables help to determine the amount of damping that is desirable for the engine mount.

One specific type of engine mount is a hydraulic engine mount. Typically, hydraulic engine mounts include a metal post that is attached to an elastomeric bladder which is then attached to the vehicle frame by another metal structure, such as a cup structure or another metal post, at an opposite end of the bladder. An incompressible fluid is located in the elastomeric bladder to provide the damping desired for a particular application. More advanced hydraulic engine mounts include a bladder or bladders that is/are partitioned into separate chambers. A first working chamber can be defined for damping normal high frequency engine vibrations, road vibration, etc., while a second compensating chamber can be provided for damping lower frequency high amplitude vibration, such as engine start up vibration or road abnormalities impacting on the vehicle suspension. The working chamber and the compensating chamber can be divided by a valve system that control damping openings. During operation, liquid constituents are displaced back and forth through the damping openings, between the working chamber and the compensating chamber, in order to provide the different damping effects.

In the radial direction of the hydraulic engine mount, supporting action has typically been attained by providing hard, rubber spring segments, while damping isolation has been provided by relatively softer, rubber spring segments.

Another even more common engine mount is the standard elastic damper that has a connection post extending from either end of a damping material for connection between the vehicle power system and the vehicle frame or body. The shape and type of material selected for the damping material provide the desired damping effect.

Other common vehicle mounts include suspension compliance bushings, sub-frame mounts, and differential mounts.

In the conventional engine mounts, little thought has been put into the ultimate motion limits for the components of the engine mount. Usually, a rigid structure is placed a predetermined distance from one of the moving structures of the engine mount such that if the movement of these moving structures exceeds a predetermined amount, a portion of the moving structures contacts the rigid structure to limit relative movement beyond that predetermined amount. For example, conventional art such as U.S. Pat. No. 6,557,839 discloses a fluid filled vibration damping device that includes a stop member 88 connected to a stud 22 such that if the stud 22 moves beyond a certain range of motion with respect to a bracket 90 (and vehicle frame), the stop member will contact an abutting portion 100 to limit the movement. A rubber buffer 94 is located on the stop member 88.

The above described conventional engine mounts operate well when their constituent parts do not move relative to each beyond a certain range of movement. However, in the event that a stop member must be used to limit the movement during operation, conventional engine mounts sometimes create unwanted noise, harshness or vibration that is transmitted to the vehicle and to the operator of the vehicle. In addition, use of the stop member sometimes results in damage to vehicle components due to the almost instant deceleration of sophisticated engine or operating components of the vehicle.

SUMMARY

According to an aspect of the disclosed subject matter, an engine mount for use with a vehicle that includes a vehicle power system, a vehicle frame, and a vehicle body can include a first connection device configured to connect to the vehicle power system, and a second connection device configured to connect to one of the vehicle frame and the vehicle body. A damper system can be located adjacent the first connection device and second connection device and configured to prevent transmission of one of vibration and motion between the first connection device and the second connection device. A stopper mechanism located adjacent to one of the first connection device and second connection device can be configured such that it provides an ultimate limit for one of axial and radial movement of the first connection device relative to the second connection device. The stopper mechanism can include a first bladder device.

In accordance with another aspect of the disclosed subject matter, the damper system can include a damper bladder structure that defines a chamber in which liquid is located and the damper system can include a brake mechanism located in the chamber of the damper bladder structure. The first bladder device of the stopper mechanism can be attached to the brake mechanism located in the chamber of the damper bladder structure.

In accordance with another aspect of the disclosed subject matter, the first bladder device of the stopper mechanism can be at least partially filled with one of glycol and silicone liquid.

In accordance with another aspect of the disclosed subject matter, an engine mount can include a stopper system, a damper system located adjacent the stopper system, a first connection structure having a movement axis and being connected to the damper system. The first connection structure can be configured to move along the movement axis and include a first portion of the stopper system. A second connection structure can have a movement axis and be connected to the damper system. The second connection structure can also be configured to move along the movement axis relative to the first connection structure and include a second portion of the stopper system. The first portion of the stopper system can be located adjacent the second portion of the stopper system such that when the first connection structure and second connection structure move a predetermined amount with respect to each other, the first portion of the stopper system contacts the second portion of the stopper system to limit the relative movement between the first connection structure and second connection structure. One of the first portion of the stopper system and second portion of the stopper system can include a bladder.

In accordance with another aspect of the disclosed subject matter, the stopper system bladder can include a fluid located within the bladder. More particularly, the stopper system bladder can include one of glycol and silicone located within the stopper system bladder. The stopper system bladder can also be connected to one of the vehicle frame, the vehicle body, and the power system.

In accordance with another aspect of the disclosed subject matter, the damper system can include a damper bladder structure that defines a chamber in which liquid is located, and the stopper system bladder can be located within the damper bladder structure. The damper system can include a brake mechanism located within the chamber of the damper bladder structure, and the stopper system bladder can be connected to the brake mechanism. The stopper system can include a stopper protrusion located adjacent the stopper system bladder and configured to contact the stopper system bladder when the relative movement between the first connection device and second connection device reaches a predetermined level.

In accordance with another aspect of the disclosed subject matter, a method for limiting relative movement in an engine stopper system can include providing a first connection device, a second connection device, a damper system located adjacent the first connection device and second connection device, and a stopper system including a contact structure located on one of the first connection device and second connection device and a bladder located on the other of the first connection device and second connection device. The method can include permitting the first connection device and second connection device to move relative to each other through a predetermined range of motion, and limiting the relative movement between the first connection device and second connection device via contact between the contact structure and the bladder after the relative movement has exceeded the predetermined range of motion.

Still other objects, features, and attendant advantages of the invention will become apparent to those skilled in the art from a reading of the following detailed description of embodiments constructed in accordance therewith, and taken in conjunction with the accompanying drawings.

BRIEF DESCRIPTION OF THE DRAWINGS

The disclosed subject matter of the present application will now be described in more detail with reference to exemplary embodiments of the apparatus and method, given only by way of example, and with reference to the accompanying drawings, in which:

FIGS. 8A-B are side and front views of another embodiment of an engine mount made in accordance with principles of the disclosed subject matter.

FIG. 9A is a cross-sectional view taken along line IXA-IXA of FIG. 8B.

FIG. 9B is a cross-sectional view taken along line IXB-IXB of FIG. 9A.

FIG. 9C is a cross-sectional view along line IXC-IXC of FIG. 9A.

FIG. 9D is a detailed view of detail D of FIG. 9C.

FIG. 10A is a partial side view of the hydraulic stopper of FIGS. 8A-B.

FIG. 10B is a partial cross-sectional side view of the hydraulic stopper of FIGS. 8A-B.

DETAILED DESCRIPTION OF EXEMPLARY EMBODIMENTS

Figure 1:
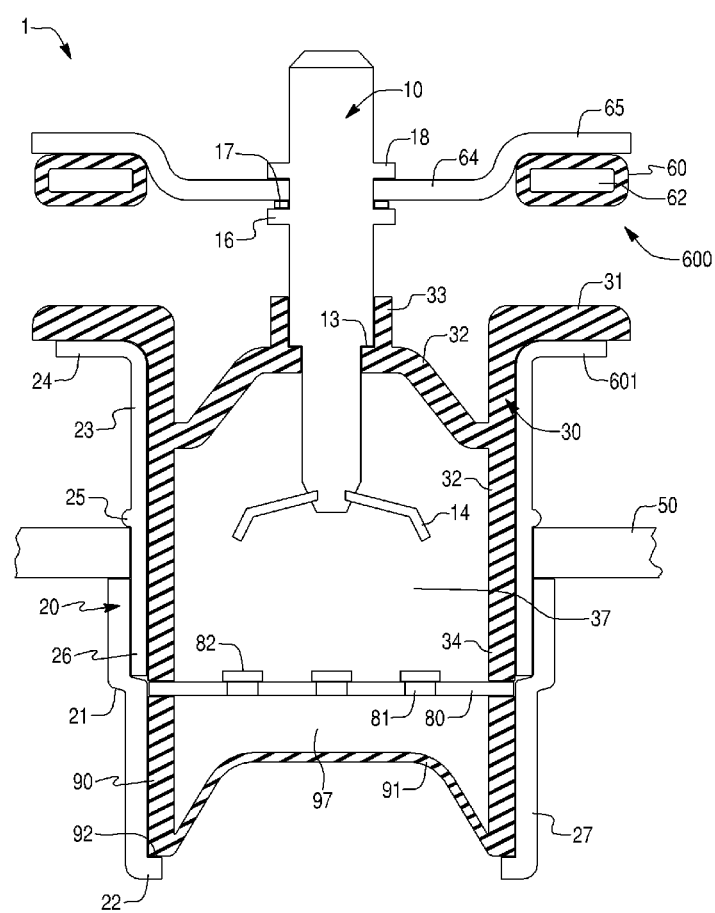
FIG. 1 is a cross-sectional front view of an embodiment of an engine mount made in accordance with principles of the disclosed subject matter.

Referring to the drawing figures, like reference numerals designate identical or corresponding elements throughout the several figures.

FIG. 1 shows a cross-sectional front view of an embodiment of a vehicle/engine mount 1 made in accordance with principles of the disclosed subject matter. The engine mount 1 can include a first connection device 10 and a second connection device 20 connected by a damper device 30. The damper device can include an elastic member 32 that forms a first operating chamber 37 in which fluid can be located. The first connection device 10 can be connected to a collar 33 of the elastic member 32.

The damper device 30 can also include an umbrella brake mechanism 14 located within the first operating chamber 37. The umbrella brake mechanism 14 can be connected to the first connection device 10 such that motion of the first connection device 10 causes the umbrella brake mechanism 14 to move within the first operating chamber. The interaction between the fluid located in the first operating chamber and the umbrella brake mechanism 14 acts to dampen the relative movement of the first connection device.

The damper device 30 can include a second chamber 97 formed adjacent the first chamber 37 and connected thereto via a damper valve plate 80. Openings 81 in the valve plate 80 allow fluid to pass between the first chamber 37 and second chamber 97. Valve mechanisms 82 can be located adjacent the openings 81 to control the amount and speed of fluid flow through the openings 81, thus also controlling the damping characteristics of the damper system 30. For example, the valve mechanisms 82 can be tuned such that the fluid in the first chamber 37 dampens a particular range of vibration/movement of the first connection device 10 relative to the second connection device 20, while the fluid from the first chamber 37 can expand into the second chamber to dampen a second range of vibration/movement of the first connection device 10 relative to the second connection device 20.

The second chamber 97 can be defined by the side walls of a second elastic member 90, a flexible bottom wall 91 of the second elastic member 90, and the damper valve plate 80.

When the first connection device 10 moves or vibrates relative to the second connection device 20 with a large amplitude characteristic, the umbrella brake mechanism 14 causes the fluid to move through the openings 81 in the valve plate 80 and into the second chamber 97. The flexible bottom wall 91 will then expand to compensate for the incoming fluid. This expansion provides further damping at the large amplitude operating range.

The second connection device 20 can be used to connect the damper system 30 to the vehicle body or frame 50. The second connection device can include a bottom collar portion 27 and a top collar portion 23. A lock ring 25 formed or attached to the top portion 23 can interact with the bottom portion 27 to lock the vehicle body or frame 50 with respect to the second connection device 20. The elastic member 32 can be attached to the top portion 23 of the second connection device 20 by vulcanization, adhesion, mechanical attachment, or other means. The second elastic member 90 can be attached to the bottom portion 27 of the second connection device 20 by vulcanization, adhesion, mechanical attachment or other means. Thus, the bottom portion 27 and top portion 23 of the second connection device 20 can be connected together with the valve plate 80 therebetween to form the first chamber 37 and second chamber 97. A shoulder 22 located on the bottom portion 27 of the second connection device 20 provides support for the bottom rim 92 of the second elastic member 90. Shoulder portion 21 can be provided in the bottom portion 27 to act in conjunction with the bottom rim 26 of the top portion 23 to lock the valve plate 80 in place and support the top portion 23 in place.

A stopper system 600 can be provided to limit the motion/vibration of the first connection device 10 relative to the second connection device 20. The stopper system can include a stopper arm 64 mounted on the first connection device 10 via a washer 17 and nut 16 that cooperate with a shoulder 18 on the first connection device 10. A contact portion 65 can be provided on the stopper arm 64 such that it is located adjacent a mating contact portion 601 located on the second connection device 20. A bladder 60 can be incorporated in the contact portion 65 and a damper shoulder stop 31 can be incorporated in the mating contact portion 601, respectively. The bladder 60 can include a chamber 62 filled with a fluid or other elastic material, such as glycol or silicone liquid. The bladder 60 can be configured to substantially reduce the vibration, noise and harshness that would otherwise occur if a typical stopper device is utilized. In particular, when relative movement/vibration between the second connection device 20 and the first connection device 10 exceeds a predetermined limit, the bladder 60 will contact the shoulder 31 of the mating contact portion 601 to limit the movement/vibration. The size, shape and fill of the bladder 60 can be selected to provide the damping that is desired to remove the vibration, noise and harshness when the contact portions 65 and 601 contact each other.

Figure 2:
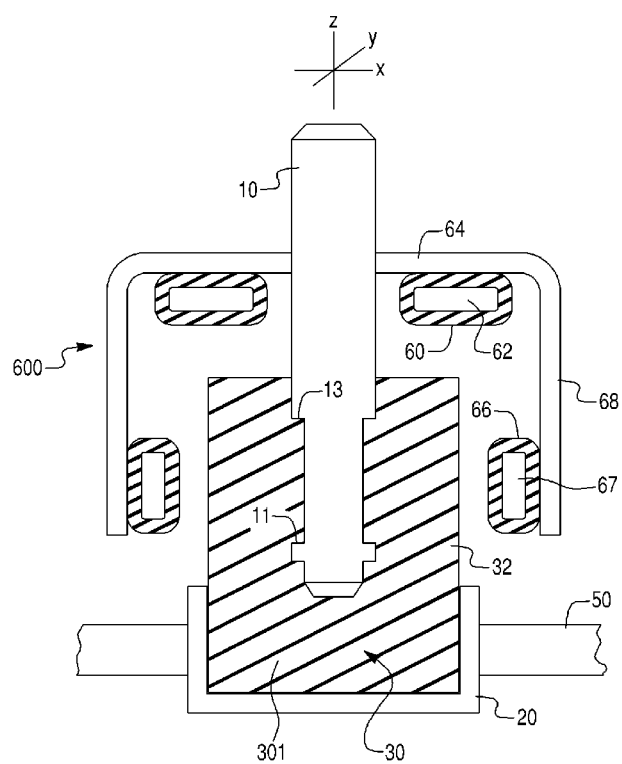
FIG. 2 is a cross-sectional front view of another embodiment of an engine mount made in accordance with principles of the disclosed subject matter.

FIG. 2 shows another embodiment of a vehicle/engine stop system made in accordance with principles of the disclosed subject matter. In this embodiment, the damper system 30 can include a solid body elastic member 301. The first connection device 10 can be secured in the elastic member 301 by a top shoulder 13 and anchor ring 11 formed in the first connection device 10.

The stopper system 600 of this embodiment can include a stopper arm 64 that includes a stopper arm wall 68 extending generally towards the second connection device 20. In this embodiment, the stopper system can provide stopping capabilities in three dimensional directions. For example, a first bladder 60 can be provided on an upper inner surface of the stopper arm 64 while a second bladder 66 can be provided on the stopper arm wall 68. The first bladder 60 will act to limit the movement of the first connection device 10 with respect to the second connection device 20 in an upward/downward direction, or "z" direction as shown in FIG. 2. The second bladder 66 will act to limit the movement of the first connection device 10 with respect to the second connection device 20 in various radial directions in the "x-y" plane, as shown in FIG. 2. Each of the bladders 60 and 66 can include a liquid or other elastic substance, such as glycol or silicone liquid located within respective chambers 62 and 67.

In operation, the bladder 60 will contact the top surface of the elastic member 301 to limit the movement of the first connection device 10 with respect to the second connection device 20 in the upward/downward "z" direction. In addition, bladder 66 will contact a side portion of the elastic member 301 to limit movement of the first connection device 10 with respect to the second connection device 20 in radial directions in the "x-y" plane.

Figure 3:
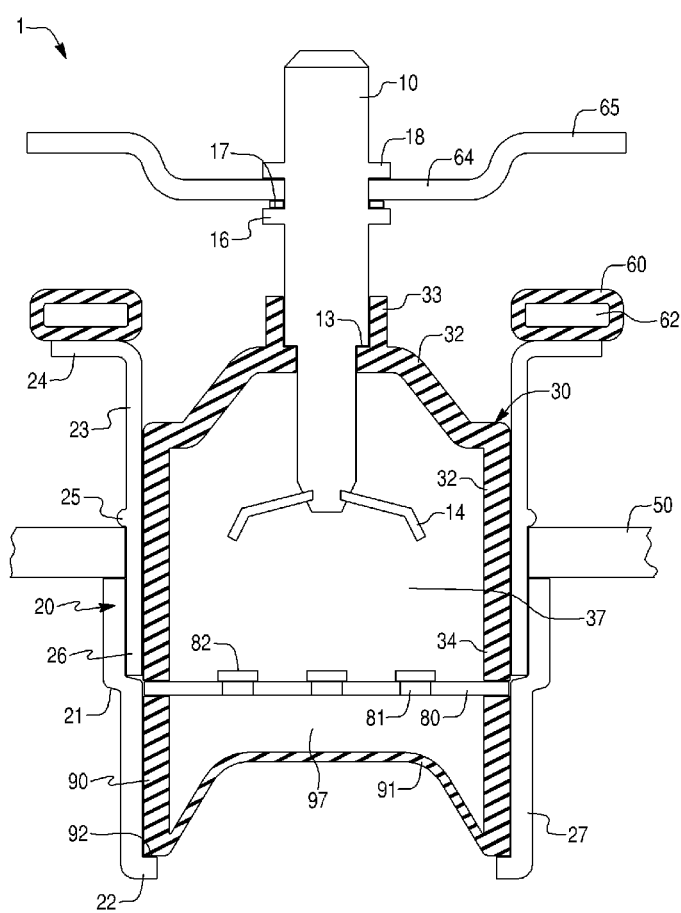
FIG. 3 is a cross-sectional front view of another embodiment of an engine mount made in accordance with principles of the disclosed subject matter.

FIG. 3 shows another embodiment of a vehicle/engine stop system made in accordance with principles of the disclosed subject matter. In this embodiment, the bladder 60 can be located on the top shoulder 24 of the top portion 23 of the second connection device 20.

Figure 4:
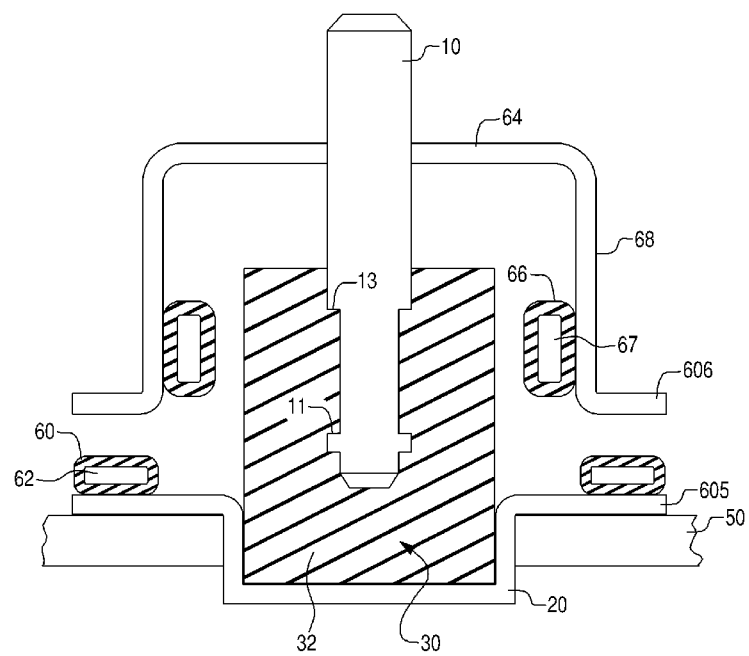
FIG. 4 is a cross-sectional front view of another embodiment of an engine mount made in accordance with principles of the disclosed subject matter.

FIG. 4 shows another embodiment of a vehicle/engine stop system made in accordance with principles of the disclosed subject matter. In this embodiment, the stopper arm 64 can be configured to include a stopper arm wall 68 that extends downward to a contact portion 606 that extends in a radial direction away form the wall 68. The second connection device 20 can include a single cup portion that has a contact portion 605 that extends around the rim of the cup portion. A bladder 60 can be located on the contact portion 605 of the second connection device 20 such that it can contact the contact portion 606 of the stopper arm to limit the movement of the second connection device 20 relative to the first connection device 10 in the upward/downward "z" direction. In addition, a bladder 66 can be located on an inner wall of the stopper arm 64 to limit movement in the radial "x-y" directions.

Figure 5:
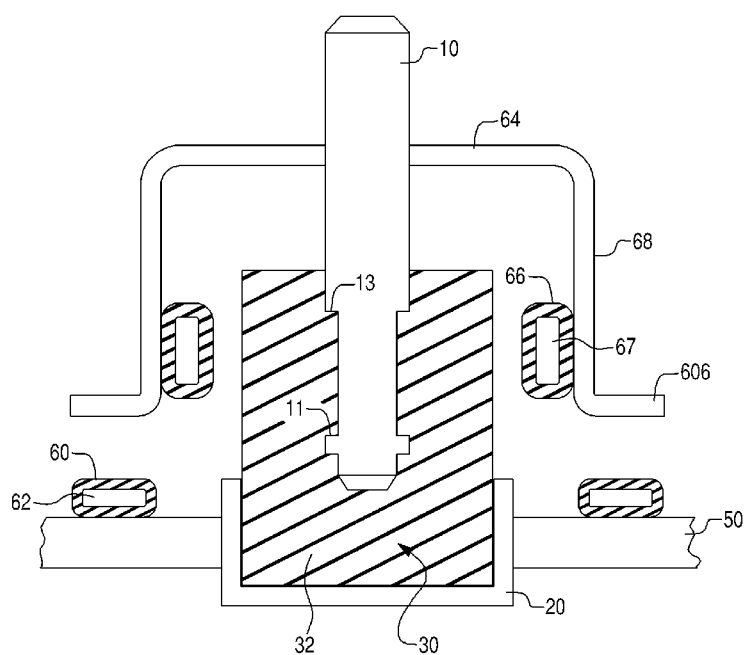
FIG. 5 is a cross-sectional front view of another embodiment of an engine mount made in accordance with principles of the disclosed subject matter.

FIG. 5 shows another embodiment of a vehicle/engine stop system made in accordance with principles of the disclosed subject matter. In this embodiment, bladder 60 can be connected directly to the vehicle frame or body 50. The second connection device 20 can also be directly connected to the vehicle frame or body 50 such that the first connection device 10 can move or vibrate relative to both the second connection device 20 and the vehicle frame or body 50. A contact arm 64 can be secured to the first connection device 10 and extend outward and then downward along wall 68. A contact portion 606 can be located at the bottom rim of the wall 68 and extend in a radial direction outward from the first connection device 10. This radially extending contact portion 606 can then contact the bladder 60 when the motion/vibration of the first connection device 10 exceeds a predetermined limit with respect to the second connection device 20. Contact between the bladder 60 and contact portion 606 of the stopper arm 64 stops further movement/ vibration between the first connection device 10 and the second connection device 20.

Figure 6:
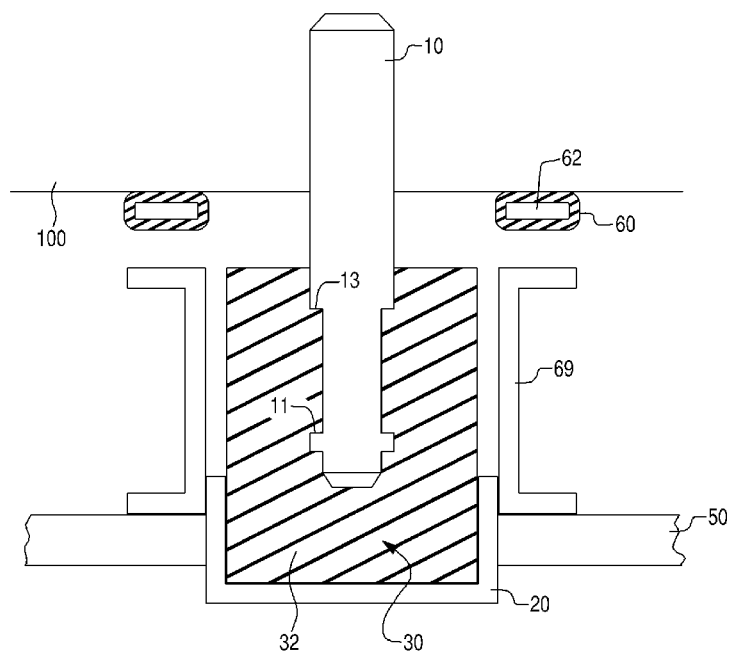
FIG. 6 is a cross-sectional front view of another embodiment of an engine mount made in accordance with principles of the disclosed subject matter.

FIG. 6 shows another embodiment of a vehicle/engine stop system made in accordance with principles of the disclosed subject matter. In this embodiment, a bladder 60 can be attached to the power system 100 of a vehicle. A stopper collar 69 can be attached to the second connection device 20 or to the vehicle frame or body 50. The stopper collar 69 includes a contact portion at the top rim of the collar 69 that is formed and located such that the bladder 60 comes into contact with the contact portion of the collar 69 when the motion/vibration between the first connection device 10 and second connection device 20 exceeds a predetermined limit. Contact between the bladder 60 and contact portion of collar 69 stops further movement/vibration between the first connection device 10 and the second connection device 20.

Figure 7:
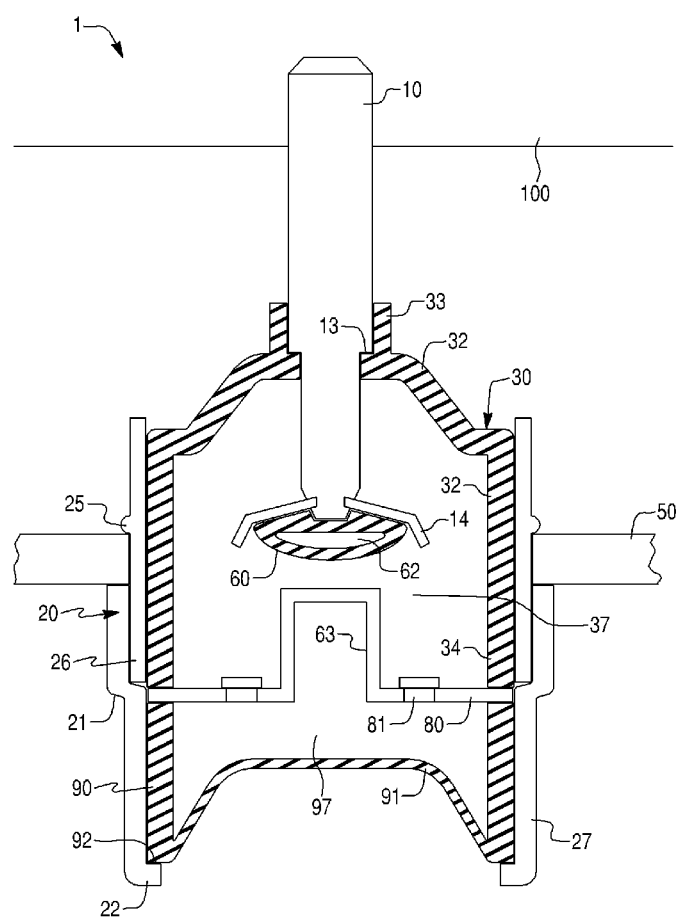
FIG. 7 is a cross-sectional front view of another embodiment of an engine mount made in accordance with principles of the disclosed subject matter.

FIG. 7 shows another embodiment of a vehicle/engine stop system made in accordance with principles of the disclosed subject matter. In this embodiment, a bladder 60 can be located on the umbrella/brake mechanism 14 of the first connection device 10. A stopper projection 63 can be formed in the valve plate 80. The stopper projection 63 can be located such that the bladder 60 comes into contact with the stopper projection 63 when the motion/vibration between the first connection device 10 and second connection device 20 exceeds a predetermined limit. Contact between the bladder 60 and stopper projection stops further movement/vibration between the first connection device 10 and the second connection device 20.

While certain embodiments of the invention are described above, it should be understood that the invention can be embodied and configured in many different ways without departing from the spirit and scope of the invention. For example, the first connection device 10 can be configured as a cup shaped device or other shaped structure, and the second connection device 20 can be configured as a stud or other structure.

The various attachment structures between the parts that compose the engine mount can also differ from those disclosed with respect to the above described embodiments. For example, the elastic member 32 can be attached to the second connection device 20 via a vulcanization process, via press fit, via adhesives, via mechanical connection structures, etc. In addition, the bladder 60 can be attached to the engine mount via a vulcanization process, via press fit, via adhesives, via mechanical connection structures, etc. The first connection device 10 can be attached to the power system 100 via screw threads, via press fit, via adhesive, via mechanical connective structures, via integral formation, etc. The second connection device 20 can be attached to the vehicle fame or body 50 via screw threads, via press fit, via adhesive, via mechanical connective structures, via integral formation, etc.

The damper 30 is disclosed as a solid body elastic body damper and a hydraulic damper. However, other types of dampers can be used with the engine mount of the present invention without departing from the spirit and scope of the invention. For example, a mechanical spring damper system, strut/shock absorber type damper system, MR fluid damper, and other damper systems can be utilized.

The bladder 60 can be formed of an elastic material, such a rubber or other elastic polymer material. The specific shape of the bladder 60 can be formed to match the particular application. The bladder can also include several bubble type bladders placed at various contact locations. A protective coating or shield can be applied to the bladder 60 to protect it from wear and puncture. The cavity 62 of the bladder 60 can also be formed in various different shapes and sizes. The size and shape of the cavity 62 will also help determine the amount and type of damping that occurs when the stopper system must be utilized.

The fluid located in the chambers 62 and 67 of bladder 60 and 66, respectively, can be various types of fluids, liquids or semi-solid materials. The important quality of the fluid or semi-solid material is that it provide the desired damping qualities for the stopper system in a given application. Thus, the fluid can be glycol, silicone, water, air, and other fluids.

The power system 100 can include a gearing system, a transmission system, an electric motor, an internal combustion engine, a pump system, other types of engines, etc. The vehicle frame or body 50 can include substantially any other component of a vehicle that is not considered part of the power system. Examples of structures that can be considered part of the vehicle frame or body 50 are the suspension system, firewalls, panels, mounting structures, etc.

FIGS. 8A-10B depict another embodiment of a vehicle/engine mount. As shown in FIG. 8A, the engine mount 302 can be attached to a vehicle sub-frame via the sub-frame mount bracket 307 located at the bottom of the engine mount 302. In addition, a mass damper mount bracket 310 can be located at the top of the housing of the engine mount 302 for attachment to a mass damper.

FIG. 8B is a cross-sectional view taken along line VIIIB-VIIIB of FIG. 8A with the mounting bracket removed, and shows the heat shield 303 located both above and below an inner collar/inner pipe 312. The inner pipe 312 is substantially surrounded by an elastic structure 313 that includes a lower portion 314, a middle portion 315, and an upper portion 317. The elastic structure 313 can be made from solid rubber or other similar elastic material, and can include open spaces 305 therein to provide flexibility, as needed. An incompressible fluid can be located within the open spaces to provide a desired characteristic damping for the engine mount 302. In addition, the open spaces 305 can be shaped differently to provide different damping characteristics. Moreover, the smaller open spaces 305 can suppress smaller vibrations while the larger open spaces 305 can suppress larger vibration noise.

FIG. 9A is a cross-sectional view taken along line IXA-IXA of FIG. 8B and shows the relationship between the elastic structure 313 and the outer ring 304 of the engine mount 302. The plurality of open spaces 305 can be provided within the outer ring 304 and bound by the elastic structure 313.

FIG. 9B is a cross-sectional view taken along line IXB-IXB of FIG. 9A and shows a different angled view of the relationship between the elastic structure 313 and the outer ring 304 of the engine mount 302. In this view, the elastic structure 313 clearly includes three different portions: lower portion 314; middle portion 315; and, upper portion 317. The different portions also define differently shaped open spaces 305 to provide a tuned damping.

FIG. 9C is a cross-sectional view taken along line IXC-IXC of FIG. 9A and shows yet another angled cross-sectional view of the elastic structure 313 and the outer ring 304.

FIG. 9D is a partial detail view of the portion designated by dashed line IXD in FIG. 9C. The elastic structure 313 is spaced from the outer ring 304 and the heat shield 303 in such a way to allow for both lateral and vertical expansion of the elastic structure 313 during operation.

FIGS. 10A and B are a detailed view and cross-sectional detailed view of the hydraulic stopper 320 shown in FIGS.

8A-B. The hydraulic stopper 320 is attached to the heat shield 303 and includes a fluid 321 located in a central area of the hydraulic stopper 320. The fluid 321 can be any of various known incompressible fluids used in automotive/vehicle applications, such as glycol and silicone, etc. During operation, if the engine mount 302 experiences a severe shock or vibration, the outer ring 304 of the central portion of the stopper 302 may come into contact with the hydraulic stopper 320. The fluid 321 located within the hydraulic stopper 320 provides an added vibration stop or damper to absorb the energy from the severe shock or vibration. Thus, the shock or vibration can be further prevented from travelling between the engine and the vehicle frame or between other structure between which the above-described vehicle/engine mount is located.

The above described embodiments are generally directed to vehicle applications. However, the engine mount of the presently disclosed subject matter can be useful in other applications in which vibration/movement isolation/damping from a power system or high vibration source is desired.

While the invention has been described in detail with reference to exemplary embodiments thereof, it will be apparent to one skilled in the art that various changes can be made, and equivalents employed, without departing from the scope of the invention. Each of the aforementioned conventional art documents is incorporated by reference herein in its entirety.

What is claimed is:

1. An engine mount for use with a vehicle that includes a vehicle power system, a vehicle frame, and a vehicle body, comprising:
   a first connection device configured to connect to the vehicle power system;
   a second connection device configured to connect to one of the vehicle frame and the vehicle body;
   a damper system located adjacent the first connection device and second connection device and configured to prevent transmission of at least one of vibration and motion between the first connection device and the second connection device; and
   a stopper mechanism located adjacent to one of the first connection device and second connection device and configured such that it provides an ultimate limit for one of axial and radial movement of the first connection device relative to the second connection device, the stopper mechanism including a first bladder device, wherein the first bladder device includes a hollow sealed elastomeric bladder formed from an elastic material that completely seals a hollow portion and a liquid contained within the hollow portion;
   wherein the hollow sealed elastomeric bladder has a first position prior to an input to the engine mount, or in response to the input where the input is less than or equal to a predetermined limit, such that the hollow sealed elastomeric bladder is completely spaced from one of the first connection device and the second connection device and the hollow sealed elastomeric bladder has a second position in response to the input to the engine mount, where the input exceeds the predetermined limit, such that the hollow sealed elastomeric bladder engages the one of the first connection device and the second connection device when the hollow sealed elastomeric bladder is in the second position, and the liquid limits maximum compression of the hollow sealed elastomeric bladder when the hollow sealed elastomeric bladder engages the one of the first connection device and the second connection device.

2. The engine mount of claim 1, wherein the damper system includes a damper bladder structure that defines a chamber in which liquid is located.

3. The engine mount of claim 2, wherein the damper system includes a brake mechanism located in the chamber of the damper bladder structure, and the first bladder device of the stopper mechanism is attached to the brake mechanism located in the chamber of the damper bladder structure.

4. The engine mount of claim 1, wherein the first bladder device of the stopper mechanism is at least partially filled with one of glycol and silicone liquid.

5. The engine mount of claim 1, wherein the stopper mechanism includes a second bladder device, and the first bladder device is configured such that it provides an ultimate limit for axial movement of the first connection device relative to the second connection device, and the second bladder device is configured such that it provides an ultimate limit for radial movement of the first connection device relative to the second connection device.

6. The engine mount of claim 1, wherein the first connection device is formed as a stud.

7. The engine mount of claim 1, wherein the second connection device is formed in a cup shape, and the damper system includes a flexible polymeric structure located within the cup shaped second connection device.

8. The engine mount of claim 1, wherein the first bladder device of the stopper mechanism is attached to the second connection device.

9. The engine mount of claim 1, wherein the damper system includes a solid elastomeric body.

10. A vehicle mount comprising:
    a stopper system;
    a damper system located adjacent the stopper system;
    a first connection structure having a movement axis and being connected to the damper system, the first connection structure being configured to move along the movement axis and including a first portion of the stopper system; and
    a second connection structure having a movement axis and being connected to the damper system, the second connection structure being configured to move along the movement axis relative to the first connection structure and including a second portion of the stopper system; wherein
    the first portion of the stopper system is located adjacent the second portion of the stopper system such that when the first connection structure and second connection structure move a predetermined amount with respect to each other, the first portion of the stopper system contacts the second portion of the stopper system to limit the relative movement between the first connection structure and second connection structure, and one of the first portion of the stopper system and second portion of the stopper system includes a bladder and a fluid contained within the bladder, and the bladder has a first position where the bladder is completely spaced from one of the first connection structure and the second connection structure prior to an input to the vehicle mount, or in response to the input where the input is less than or equal to a predetermined limit, and a second position where the bladder engages the one of the first connection structure and the second connection structure in response to the input to the vehicle mount, where the input exceeds the predetermined limit, and the fluid limits maximum compression of the bladder when the bladder engages the one of the first connection structure and the second connection structure.

11. The vehicle mount of claim 10, wherein the stopper system bladder includes one of glycol and silicone located within the stopper system bladder.

12. The vehicle mount of claim 10, wherein the stopper system bladder is connected to one of the vehicle frame, the vehicle body, and the power system.

13. The vehicle mount of claim 10, wherein the damper system includes a damper bladder structure that defines a chamber in which liquid is located, and the stopper system bladder is located within the damper bladder structure.

14. The vehicle mount of claim 13, wherein the damper system includes a brake mechanism located within the chamber of the damper bladder structure, and the stopper system bladder is connected to the brake mechanism.

15. The vehicle mount of claim 13, wherein the stopper system includes a stopper protrusion located adjacent the stopper system bladder and configured to contact the stopper system bladder when the relative movement between the first connection device and second connection device exceeds the predetermined limit.

16. A method for limiting relative movement in a vehicle stopper system, comprising:
providing a first connection device, a second connection device, a damper system located adjacent the first connection device and second connection device, and a stopper system including a contact structure located on one of the first connection device and second connection device, a bladder located on the other of the first connection device and second connection device, wherein the bladder includes a hollow elastomeric bladder formed from an elastic material that completely seals a hollow portion and a fluid contained within the hollow portion;
permitting the first connection device and second connection device to move relative to each other through a predetermined range of motion, wherein the predetermined range of motion includes a first position prior to an input to the engine mount, or in response to the input where the input is less than or equal to a predetermined limit, such that the bladder is completely spaced from the contact structure, and a second position in response to the input to the engine mount, where the input exceeds the predetermined limit, such that the bladder initially engages the contact structure;
limiting the relative movement between the first connection device and second connection device via contact between the contact structure and the bladder such that fluid pressure increases and limits maximum compression of the bladder when the bladder engages the contact structure.

17. The method for limiting relative movement of claim 16, further comprising:
not limiting the relative movement between the first connection device and second connection device before the relative movement has exceeded the predetermined range of motion.

18. The method of claim 16, wherein the bladder defines a chamber that includes a liquid located therein.

* * * * *